J. E. STARR.
REFRIGERATING APPARATUS.
APPLICATION FILED JAN. 30, 1906.
967,992.
Patented Aug. 23, 1910.
2 SHEETS—SHEET 2.
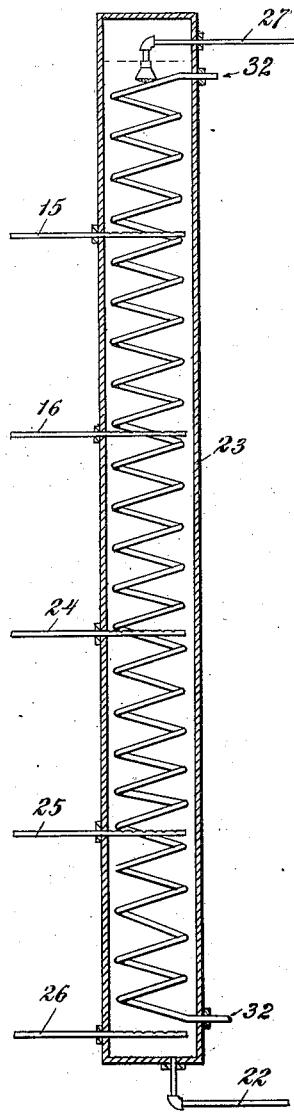
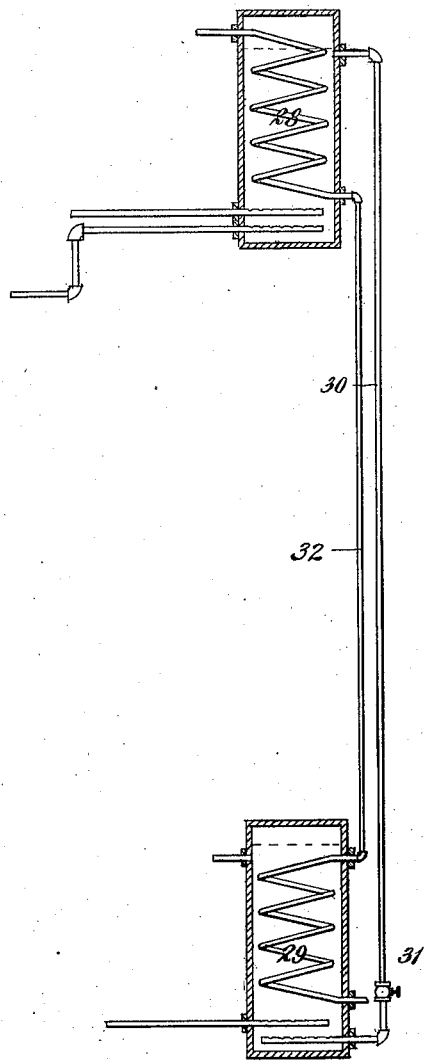

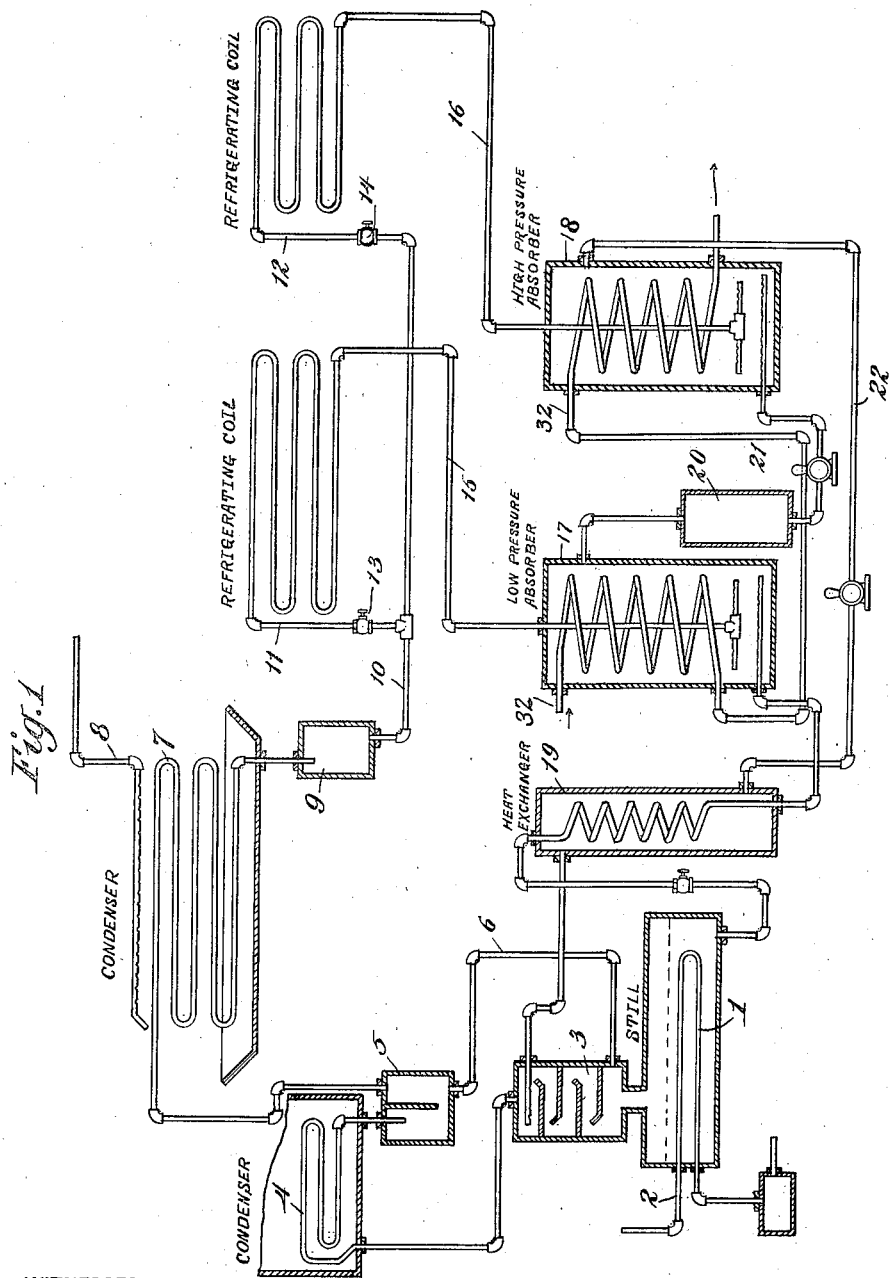

UNITED STATES PATENT OFFICE.

JOHN E. STARR, OF NEW YORK, N. Y.

REFRIGERATING APPARATUS.

967,992.  Specification of Letters Patent.  Patented Aug. 23, 1910.

Application filed January 30, 1906. Serial No. 298,575.

*To all whom it may concern:*

Be it known that I, JOHN E. STARR, a citizen of the United States, residing at New York, in the county of New York and State of New York, have invented certain new and useful Improvements in Refrigerating Apparatus; and I do hereby declare the following to be a full, clear, and exact description of the same, such as will enable others skilled in the art to which it appertains to make and use the same.

My invention relates to improvements in absorption refrigerating apparatus, and comprises means whereby a single such apparatus may maintain refrigeration at a plurality of different planes of temperature and pressure, simultaneously, and with high efficiency and increased capacity as compared with other absorption refrigerating apparatus of corresponding size, and whereby such apparatus may effect a relatively great difference between the strengths of the strong liquor entering the still and that of the weak liquor leaving the still, and may raise the strength of the liquor, during absorption, to a relatively high degree, while maintaining a relatively low temperature in the expansion coils.

My invention further comprises means whereby the capacity of existing absorption refrigerating machines may be increased greatly, with increase of economy of operation, at slight expense.

The objects of my invention are, first, to increase the efficiency of absorption refrigerating apparatus; second, to permit a single such apparatus to perform refrigeration efficiently at a plurality of different planes of temperature and pressure, simultaneously; third, to avoid limitation of the strength of the solution in the absorber to the strength corresponding to the pressure at which refrigeration on the lowest plane is conducted, and to permit the production of a solution having a strength corresponding to the pressure at which refrigeration on the highest plane is conducted; fourth, to increase the capacity of existing refrigerating apparatus, at slight expense; fifth, to economize the consumption of cooling water; and generally, to make the apparatus more efficient, and more elastic in its adaptability to existing conditions than former similar apparatus, and as simple as possible.

In nearly all cases where refrigeration is required, the heat may be taken up on two or more different planes of temperature, with material gain in efficiency of the apparatus, and with other advantages as well. Thus, to cite two only of many well known examples: In the making of ice, while the freezing is usually done with a refrigerating fluid at a temperature of about zero Fahrenheit, corresponding to an ammonia pressure of 15 lbs. above the atmosphere, the water must first be cooled from a relatively high temperature (say 60 to 90 degrees F.), to 32 degrees, before it begins to freeze, and this preliminary cooling may be performed most economically by a refrigerating fluid having a temperature more nearly approximating the freezing point than that which effects the freezing—say a fluid having a temperature of 25 degrees, which temperature is produced by ammonia boiling at 38 lbs. pressure. Also, in cold storage warehouses it is common to keep certain rooms at about 32 degrees F., while other rooms are kept at zero.

Now with refrigerating machines as ordinarily constructed, either all of the heat must be taken up at the lowest plane of temperature and pressure, which in the case of absorption refrigerating machines means the maintenance of relatively low pressure in the absorber and the production of a relatively weak solution thereby, or two machines operating at different planes of temperature and pressure must be used.

The strength of the ammonia solution produced in the absorber depends upon the pressure maintained therein; the greater the pressure, the stronger the solution which may be obtained, other things being equal; and for various reasons explained presently, the efficiency of absorption refrigerating apparatus is greater, the greater the range between the strength of the weak liquor as it leaves the still and that of the strong liquor as it enters the still. Evidently, therefore, it is desirable to maintain a relatively high pressure in the absorber; but this has not been practicable heretofore when low temperatures were required. This difficulty has been overcome, by my invention, by maintaining different pressures in different portions of the absorber, which latter may be divided into a plurality of chambers, the gas from each expansion or refrigerating coil being admitted into that chamber or portion of the absorber the pressure of which corresponds to the pressure to be maintained in the expansion coil, the ammonia liquor, however, being passed successively from the portion or portions of the absorber in which the pressure is relatively low to the portions in which the pressure is high In this way I am able, in one refrigeratting apparatus, to maintain different planes of temperature and pressure and at the same time to produce in the absorber a much stronger ammonia solution than it is practicable to produce in ordinary absorption apparatus in which the pressure is limited to that of the lowest plane of temperature.

One feature of my invention, therefore, consists in maintaining different pressures in different portions of the absorber, and in admitting the return gas from each refrigerating coil to that portion of the absorber the pressure in which approximates the pressure desired to be maintained in said coil.

Other features of my invention will be pointed out hereafter.

I will now proceed to describe my invention with reference to the accompanying drawings, in which certain forms of absorption refrigerating apparatus embodying my invention are illustrated diagrammatically, and will then point out the novel features in claims.

In the said drawings, Figure 1 shows diagrammatically and in section a complete absorption refrigerating plant comprising two refrigerating lines or coils and an absorber divided into a corresponding number of sections, the apparatus being arranged to maintain different planes of temperature and pressure in the two coils. Fig. 2 shows diagrammatically an alternative form of absorber which may be employed, comprising a single vessel in different portions of which there are different pressures, owing to difference of elevation and consequent hydrostatic head. Fig. 3 shows diagrammatically a further alternative form of absorber comprising a plurality of chambers in which there are different pressures owing to different heights of the chambers with respect to each other.

Referring first to Fig. 1, numeral 1 designates a still in which a gaseous refrigerating agent, such as ammonia, is distilled from a solution thereof, such as aqua ammonia, by heat supplied by suitable means, as for example the steam pipe 2. In the preceding portion of this description, for purpose of illustration ammonia has been referred to as the refrigerating agent employed, and for the same purpose I shall continue herein to refer to ammonia as the refrigerating agent used; but it will be understood that I do not thereby limit myself to the use of ammonia as the refrigerating agent to be employed in my apparatus.

3 designates a column or analyzer in which the uprising ammonia gas from the still encounters a downflowing stream of strong aqua ammonia, and imparts heat thereto and is in turn deprived of a portion of the aqueous vapor carried by it.

4 designates a condensing or cooling coil through which the ammonia gas passes as it leaves the analyzer 3, said coil located in a tank which may contain water or other cooling liquid, whereby the aqueous vapor remaining in the ammonia gas after it leaves the analyzer is condensed. 5 designates a trap by which the water so condensed is separated from the ammonia gas, and 6 a pipe by which such water is returned to the distilling apparatus. 7 designates another condensing coil, arranged to be cooled, in the instance shown, by water sprayed from a pipe 8, whereby the ammonia gas is condensed to liquid form. The liquid anhydrous ammonia so condensed is collected in a reservoir 9, from which it flows into the supply line 10.

11 and 12 designate two refrigerating coils, lines or circuits, connected to the supply line through so-called "expansion" valves 13 and 14 respectively, and 15 and 16 designate separate return lines for said refrigerating lines. The refrigerators, cooling-chambers, ice-making tanks or the like which are cooled by refrigerating lines 11 and 12 are not illustrated, but it will be understood that such lines may be used for any of the purposes for which artificial refrigeration is customarily used.

The absorption apparatus shown in Fig. 1 comprises two absorption vessels, 17 and 18, connected as hereinafter described and together constituting in effect a single absorber in the two sections of which different pressures are maintained.

19 designates a heat exchanger in which the weak aqua ammonia, as it is drawn off from the bottom of the still 1, exchanges heat with the strong aqua ammonia passing from absorption vessel 18 to the distilling apparatus. The weak aqua ammonia is delivered from the exchanger 19 into the first absorption vessel, 17, wherein it absorbs the ammonia gas returned from the first refrigerating line, 11, by return line 15; and being thereby made stronger, it rises and passes into a reservoir 20, from which it is passed by means of a pump 21 into the second absorption vessel, 18, encountering there the ammonia gas returned from refrigerating line 12. The strong aqua ammonia thus produced is returned from vessel 18, by means of a pipe 22, and pump, to the distilling apparatus, passing as it does so through the exchanger 19, as already explained.

Heretofore it has been customary in absorption refrigerating apparatus to admit all of the gas returned to the absorber at the same pressure. The pressure in the absorber therefore could not be greater than that of the gas returned from any one of the expansion coils. But the strength of the strong liquor produced in the absorber depends upon the pressure therein, a relatively high pressure being necessary to obtain a strong solution. Hence, if all of the gas is returned at the plane of pressure set by the lowest temperature required to be produced, the liquor delivered from the absorber will be much weaker than if it had absorbed to the full the gas which it might have absorbed under a pressure corresponding to the highest temperature which the refrigerating apparatus is required to produce. Conducting at the lowest plane refrigeration that might be conducted at a plurality of planes of temperature and pressure is accompanied by the following losses, therefore: (a) the loss due to conducting refrigeration at a lower plane than necessary; (b) the loss due to the fact that the strength of the solution produced in the absorber is only that which can be produced at the pressure corresponding to the lowest temperature to be maintained, so that the difference between the strength of the solution entering the still and that of the solution leaving the still is relatively small, and the operation of the still is relatively uneconomical; (c) the loss due to the relatively great amount of cooling water required. Still other losses and objections might be mentioned.

In an absorption refrigerating machine both the economy and the efficiency of the apparatus depends in a large degree on the strength of the solution presented to the still, i. e., the percentage of the ammonia absorbed in and in solution in the water. When the solution is stronger, the temperature necessary to drive out of the solution a given quantity of ammonia is lower than when the solution is weaker; hence a given area of heating surface will transfer more heat (the source being the same in both cases, say a steam pipe containing steam of the same pressure in both cases) to a strong solution than to a weak solution, on account of the greater heat head, or difference between the temperature of the steam and that required to evaporate off the desired quantity of ammonia. Thus, 38% aqua ammonia (i. e., aqua ammonia containing 38% ammonia) under 150 lbs. pressure boils at 214 F., while 18% aqua ammonia at the same pressure boils at 270 F. Hence a square foot of surface heated by steam at say 280 F. would drive out much more ammonia from the 38% solution than from the 18% solution in a given period of time, as the heat head in the one case is 66 degrees, and in the other case only 10 degrees. Hence the greater the strength of the solution entering the still, the greater the capacity of the still. Again, the amount of heat, measured in heat units, required to drive a unit weight of ammonia out of the strong solution is less than that required to drive it out of the weak solution, and hence the economy of the apparatus is higher when using a strong solution.

It is also a fact that the range of strength of the solution in the apparatus, viz., the difference between the strength of the solution entering the still and that of the weak solution leaving the still has a great deal to do with the economy of the apparatus, and also with the first cost thereof. If the range be small, (for example, from 38% down to 25% only) the total amount of aqua ammonia to be heated to its boiling point is much greater than if the range be great (for example, from 38% down to 18%). The strong aqua ammonia after leaving the absorber has to be heated up to its boiling point in the still, and the weak aqua ammonia leaving the still has to be cooled down to the temperature corresponding to its boiling point at the pressure at which it enters the absorber; a loss of heat being therefore inevitable. This loss is reduced by the exchanger; but if the range of strength of solution is small, and the total amount of ammonia solution circulated therefore great, a large exchanger, having a high first cost, must be used; and further, the cost of pumping the larger quantity of liquid is greater.

It will be instructive as to the merits of my invention, to assume actual figures for the pressures in the chambers of the absorber and the strengths of the solution. Assuming that the pressure in chamber 17 is that of the atmosphere, corresponding to a temperature of −29.6 degrees F. in coil 11, and assuming that the weak solution enters this chamber 17 at 18% strength and 126 F. temperature, its strength may be raised therein to 25%, provided its temperature is reduced to 101 F. Now, if as in former practice, the gas from all of the expansion coils were returned to the absorber at the pressure determined by the coil which produced the lowest temperature, 25% would be the greatest strength of solution which could be produced at the pressure assumed without excessive lowering of the temperature of the solution, requiring an excessive amount of cooling water. In the still, the range of temperature of boiling point of the solution would be from 250 F. to 274 F. (assuming a pressure therein of 140 lbs.), giving a mean temperature of 262 F.; and figuring heat head from steam at 280 F., such head is only 18 degrees. By the use of the second absorption chamber, 18, however, the strength of the solution may be raised to 38%, the pressure therein being 35 lbs., corresponding to a temperature of plus 22 degrees F. in coil 12, and the temperature maintained in chamber 18 being not in excess of 132 degrees F. The range of boiling temperature of the solution, in this case, is from 214 F. to 274 F., at the still pressure previously assumed, giving a mean temperature of 244 F. and a heat head of 36 degrees. Since the efficiency of heating surface is nearly proportional to the difference in temperature, or heat head, it follows that by using the 38% solution the heating surfaces have twice the capacity as when using the 25% solution, which would give a saving in the amount of steam used, assuming a perfect exchange of heat in the exchanger, of about 23%. But as for the weaker solution a much larger exchanger would be required than for the stronger solution (as already explained) and much more power is required for the pumping of the greater quantity of the weaker solution, the real gain is even greater than this. It will be seen, therefore, that by so arranging the absorber that the ammonia may be returned from the expansion coils thereto at such pressures as are actually required for the production of the necessary temperatures, and by passing the strong liquor from that portion of the absorber in which the pressure is lowest to that portion of the absorber in which the pressure is higher, a much stronger solution may be obtained, and important economies realized both as to the efficiency of the machine, its first cost, and cost of operation, and the capacity of the machine is much higher. It will also be noted that since the temperature in the second absorption chamber may be higher than that in the first, owing to the higher pressure therein, the cooling water may be passed from the cooling coils of the first chamber into those of the second chamber, and in this way a greatly increased range of temperature of cooling water may be obtained, with consequent reduction in the amount of cooling water required—a consideration which is often of very great importance. This is illustrated in Fig. 1, the cooling coils 32 of the two chambers 17 and 18 being shown as connected in series.

I have not attempted in the drawings to illustrate details of construction of the apparatus, as these may be such as is customary.

The two absorption chambers 17 and 18 of Fig. 1 constitute in effect a single absorber. It is not necessary that the absorber shall be divided into a plurality of separate chambers, as in Fig. 1, however.

Fig. 2 illustrates an alternative arrangement, in which a single chamber has different pressures maintained in different parts of it, owing to difference of hydrostatic head. 23 designates a vertical absorption chamber of sufficient height to give, near its bottom, the maximum pressure required, by hydrostatic pressure. 15, 16, 24, 25 and 26 designate return lines from different expansion coils or refrigerating lines, not shown, each return line connected to the vessel 23 at the height which corresponds to the pressure to be maintained in such return line—the height of the liquid in vessel 23 being assumed to be practically constant. The weak liquor enters said vessel at the top, through pipe 27; and the strong liquor escapes at the bottom, through pipe 22. It will be obvious that such an absorber is capable of serving a large number of refrigerating lines, each connected thereto at the point at which the hydrostatic pressure in the vessel, when the liquor therein is at normal level, is equal to the pressure to be maintained in the return pipe of such refrigerating line.

When only a few refrigerating lines are to be served, an arrangement such as that shown in Fig. 3 may be employed, in which two absorption vessels, 28 and 29, are arranged at different heights corresponding to the difference in pressure to be maintained, the aqua ammonia flowing from the top of the upper vessel, through a pipe 30, into the vessel 29. A valve 31 may be provided in this pipe, to regulate the flow. Obviously there may be a number of these absorption vessels, connected in series as shown, and arranged at different heights corresponding to the different pressures to be maintained in them.

The arrangements shown in Figs. 2 and 3 obviate the necessity of pumping the solution from one vessel to the other, as in the arrangement shown in Fig. 1.

It will be obvious that my invention is readily applied to existing refrigerating plants. In cases where a plurality of expansion coils, required to maintain different temperatures, are now connected to the same absorber, I may add a second absorption vessel, or several absorption vessels, according to circumstances, or connect several expansion coils to different portions of the same vessel, according to the arrangement shown in Fig. 2, and thereby greatly increase the capacity of the plant, while causing it to operate more efficiently; or where an existing refrigerating plant is now operating at one plane of temperature I may, by similarly arranging the absorber thereof in accordance with my invention, adapt the same plant for doing additional refrigeration on another plane without change in the other parts of the plant other than the addition of the new refrigerating coils, etc., to be served.

What I claim is:—

1. In refrigerating apparatus, the combination with an absorber comprising a plurality of absorption vessels in which different pressures are maintained, and means for conducting the absorbing liquor from one to the other comprising a conduit connecting the portion of the low-pressure vessel which contains the strong liquor with the portion of the high-pressure vessel which contains the weak liquor of such vessel, of a plurality of refrigerating lines in which different pressures are to be maintained, connected each with one of said vessels.

2. In refrigerating apparatus, the combination with an absorber comprising a plurality of absorption vessels in which different pressures are maintained, and means for conducting the absorbing liquor from one to the other comprising a pump and a storage reservoir between the suction side of said pump and the first of said vessels, of a plurality of refrigerating lines in which different pressures are to be maintained, connected to different absorption vessels.

3. In refrigerating apparatus, the combination of a plurality of refrigerating lines and a plurality of absorption vessels in which different pressures are maintained, and means for conducting the liquor from one vessel to the other in the direction of increase of pressure, said vessels provided with conduits for the flowing of cooling fluid, connected together and likewise arranged to circulate such fluid in the direction of increase of pressure in said vessels.

In testimony whereof I hereunto affix my signature, in the presence of two witnesses.

JOHN E. STARR.

Witnesses:
STEPHEN BARKER,
JOHN E. BATTEN.